Figure 4:
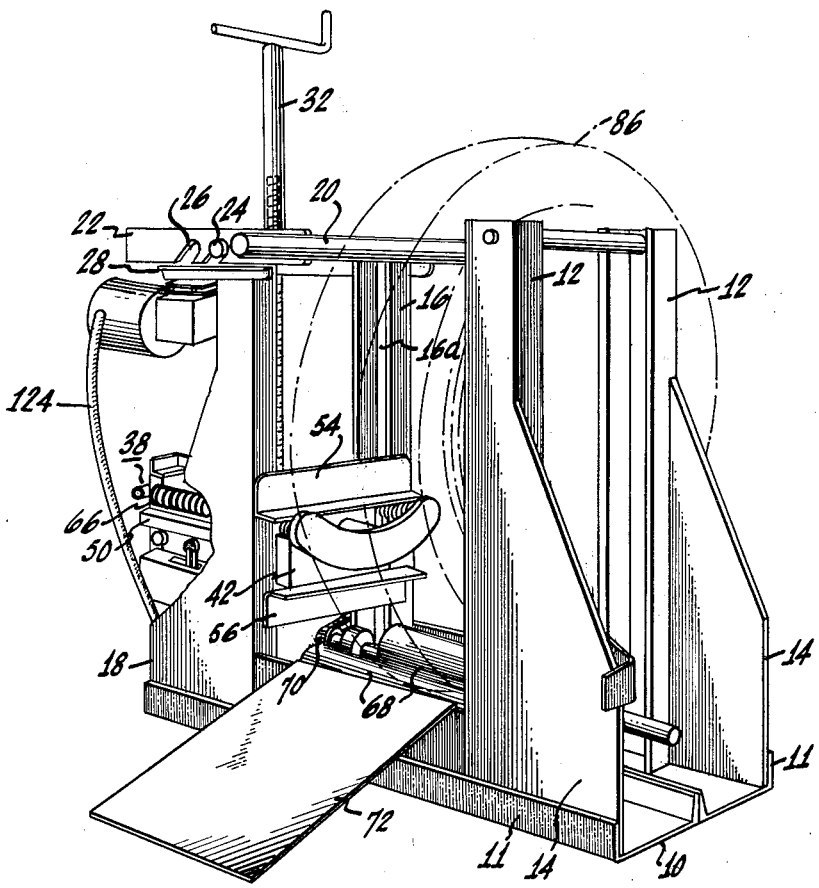
Figure 4:
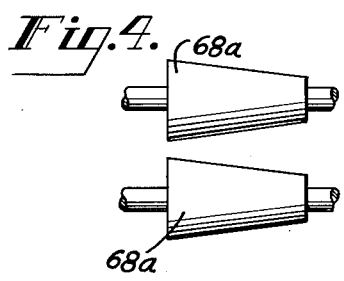

May 8, 1962 C. S. SCHAEVITZ 3,033,268
TIRE DEMOUNTING MACHINE
Filed June 1, 1960 3 Sheets-Sheet 1

INVENTOR
CHARLES S. SCHAEVITZ

May 8, 1962  C. S. SCHAEVITZ  3,033,268
TIRE DEMOUNTING MACHINE

Filed June 1, 1960  3 Sheets-Sheet 2

INVENTOR
CHARLES S. SCHAEVITZ

May 8, 1962

C. S. SCHAEVITZ 3,033,268

TIRE DEMOUNTING MACHINE

Filed June 1, 1960

3 Sheets-Sheet 3

INVENTOR.
Charles S. Schaevitz,
BY
Paul & Paul
ATTORNEYS.

United States Patent Office 3,033,268
Patented May 8, 1962

3,033,268
TIRE DEMOUNTING MACHINE
Charles S. Schaevitz, Collingswood, N.J., assignor to Schaevitz Bros., Inc., Pennsauken Township, N.J., a corporation of New Jersey
Filed June 1, 1960, Ser. No. 35,103
3 Claims. (Cl. 157—1.26)

This application is a continuation-in-part of my earlier patent application entitled "Tire Demounting Machine" Serial No. 825,294, filed July 6, 1959, and later abandoned.

The present invention relates to machines for demounting tires.

The demounting of truck tires is especially difficult. Dirt, grime, and grease often seal the tire to the rim so tightly that pneumatic hammer tools must usually be employed with considerable labor at the tire bead to release the tire from the rim. However, these hammer tools damage the bead, often spoiling a tire which otherwise could be repaired or used for re-capping. Many machines that have been constructed for the demounting of tires are complicated, and large and expensive to construct. Some of these machines require extremely large forces to be exerted, because it is proposed, in their operation, to try to release the entire circumference of the tire from one side substantially at one time. Also, these machines require complicated apparatus for handling the tires, and extensive labor to make complicated adjustments for handling tires of different sizes.

It is an object of the present invention to provide a novel tire demounting machine.

Another object of the invention is to provide a tire demounting machine which is simple in construction and operation compared to prior machines.

Another object of the invention is to provide a tire demounting machine which is economical to construct.

Still another object of the invention is to provide a novel tire demounting machine which is simple and easy to operate on all sizes and types of tires, rims, and wheels.

In accordance with a preferred embodiment of the invention, the tire to be demounted, on its rim, is positioned without lifting in its normal vertical position on a platform which employs rollers whereby the tire may be rotated to a desired orientation. A suitable backing is provided by a pair of uprights. Another pair of uprights acts as a guide for a piston chamber, which is suspended by a threaded support for vertical adjustment. A piston operative within the piston chamber has on its free end a shoe. This shoe is, preferably, about one-sixth the mean circumference of the tire in the circumferential direction. For removal of a tire, the piston is adjusted to be opposite a side portion of the tire, and forced against the tire, thus releasing a portion thereof from the rim. The tire is rotated on the roller for about a sixth of its circumference, and again the piston is operated to press the shoe against the side wall of the tire to release a further portion thereof. The process is continued until one entire side of the tire is released, and then the tire is turned around, and the other side similarly treated. Thereafter, the rim and tire may be readily separated manually. I have found that the injuries to the tire from the application of the usual pneumatic hammer on the tire bead due to the small area over which the total force is applied are obviated by the use of this machine. By employing a tool of fairly large area, injury to the tire is avoided but the seal to the rim may be readily broken with little difficulty in even the most stubborn cases without injury to the tire. Further my arrangement is simple and easy to operate.

Figure 1:
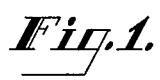
Figure 2:
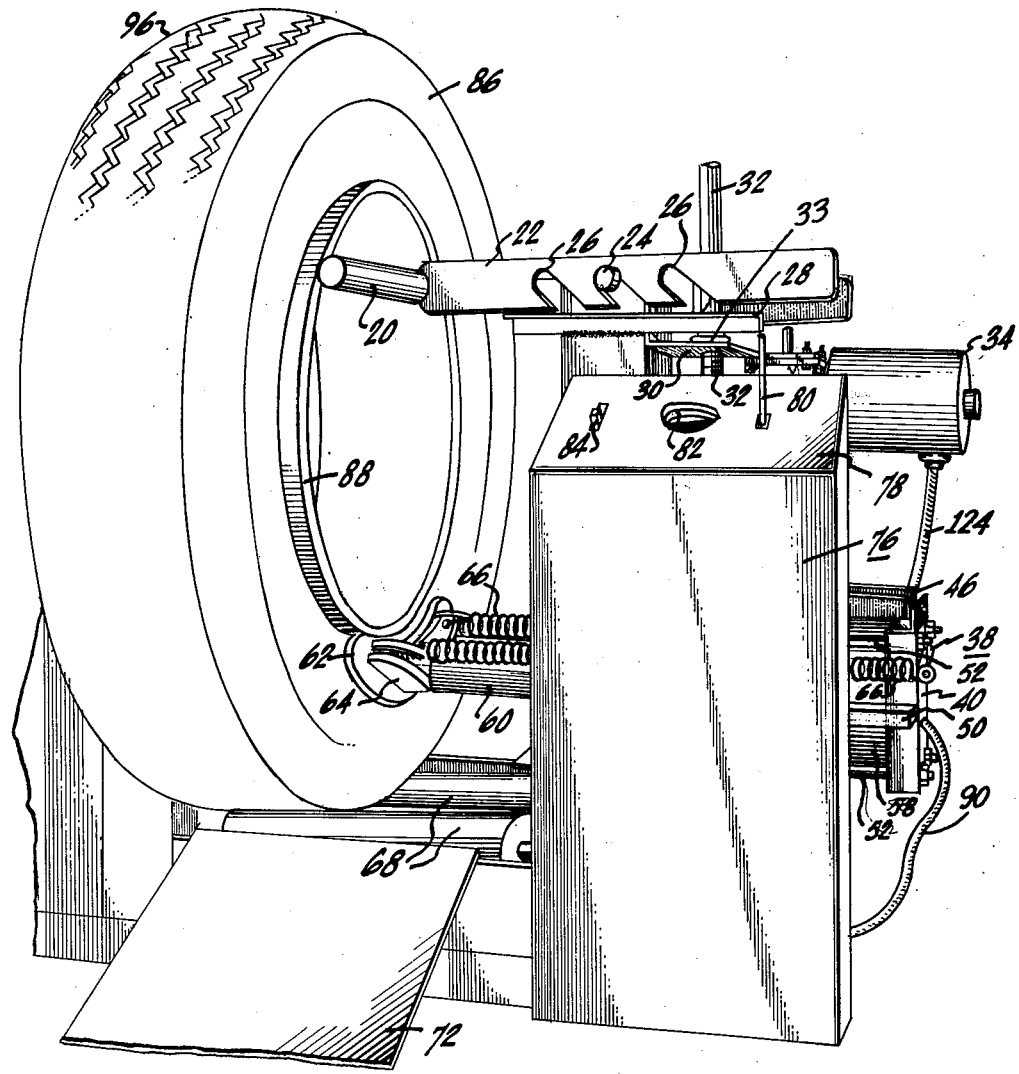
Figure 3:
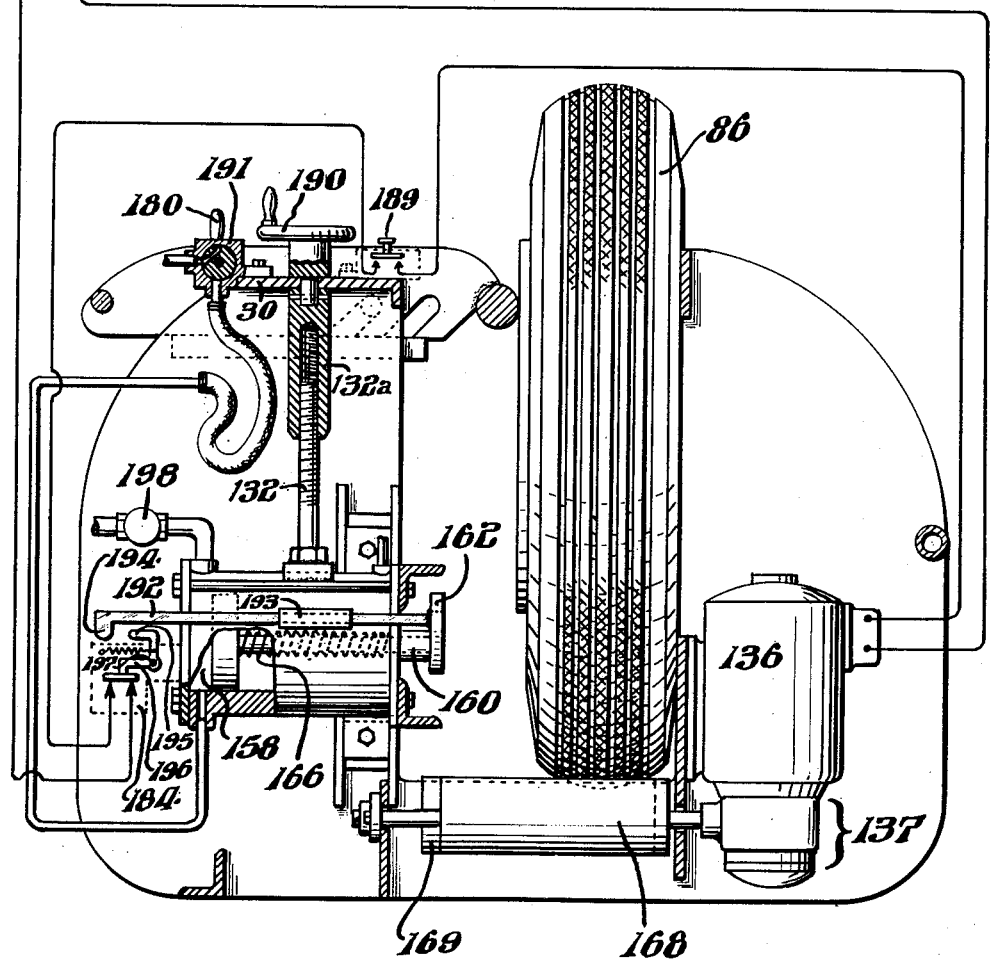

The foregoing and other objects, advantages, and novel features of the invention will be more fully apparent from the following description when read in connection with the accompanying drawing in which like reference numerals refer to like parts in which:

FIGURE 1 is a perspective view from in front and to one side of one embodiment of a tire demounting machine according to the invention, FIGURE 2 is a perspective view of the machine of FIG. 1 as seen from the opposite side, FIG. 3 is a side elevational view, partly in section, of a machine generally similar to that of FIGS. 1 and 2 but modified as will be described hereinafter, and FIG. 4 is a top view of a pair of tapered rollers.

Referring now to FIGS. 1 and 2, the tire demounting machine comprises a base 10 having outer flanges 11 on which are mounted a first pair of angle-bar vertical uprights 12 which serve as a backing for the tire during operation of the machine. A pair of plates 14 assist in supporting the backing uprights 12 and are welded both to the uprights and to the flanges 11 to lend stiffness. Opposite the first pair of uprights 12, a second pair of guiding channel-bar uprights 16 are mounted on the base and a second pair of stiffening plates 18 are welded at their joinings to uprights 16 and the flanges 11. Near the top of the second uprights 16, a horizontal bar 20 is supported by attachment near its center to a pair of symmetrically-notched spaced and parallel plates 22. A pair of pins 24, one on each side, are attached to the second angle-bar uprights so that they are received in the notches 26 of the plates 22. The horizontal bar 20 may thus be selectively positioned forward or backward, away from or toward, the first uprights 12 by selecting the notches 26 into which the pins 24 are received. The notches 26 are slanted to prevent backward movement of the bar 20 mounted on the plates 22. Angle irons 28 connected to the second uprights 16 immediately under and parallel to the notched plates 22 prevent their tipping so that the tire is maintained in a vertical position. A suitable support platform 30 is connected between the second uprights 16 near their top. Centrally through this support platform 30 extends a threaded vertically-disposed hanger rod 32 which cooperates with a nut 33 in the platform. Rod 32 may be rotated manually with a crank as seen in FIG. 1. Alternatively, the nut 33 may be driven through suitable gearing by the motor 34, the shaft thereof driving the gearing, thus raising or lowering the hanger rod 32.

At its lower end, the threaded rod 32 is attached to an open work frame 38. The frame 38 includes a rectangular back plate 40, a front plate 42, top bars 46, and side rectangular bars 50. Between the top bars 46 extends a top cross bar (not shown) to which the threaded rod 32 is attached. Also, at the four corners of the rectangular back plate 40, extending forward therefrom, are four tension rods 52 fastened at these four corners and extending through the four corners of a rectangular front plate (similar to the back plate 40, but not visible). After extending through this front, rectangular plate, which is located behind the second pair of uprights 16, the upper pair of the tension rods terminate in an upper horizontal angle bar 54, and the lower pair in a lower horizontal angle bar 56. Within the frame 38 is suspended a pneumatic piston chamber 58 attached to the back plate 40. The frame assembly may include guide blocks fitted in the channels of the channel uprights. A piston rod 60 extends from within the chambers 58. At its free end, the piston rod 60 carries an arcuate shoe 62 with side stiffeners 64. Tension springs 66 are connected between the shoe and the back of the frame 38, one from each side of the shoe, along the side of the frame, to the rear of the frame 38. These springs urge the shoe and the piston rod backward, so that the piston tends to remain withdrawn into the piston chamber 58.

In the base 10 are journalled a pair of rollers 68. One of these rollers 68 is driven by a chain drive 70, although they may be manually operated. These rollers may be tapered, as illustrated in FIG. 4 by rollers 68a having their axes arranged parallel to each other, or, alternatively, the rollers may be cylindrical but mounted on divergent axes as illustrated in FIG. 2. In either event, the surfaces of the rollers are preferably lower and more widely spaced at the forward end. This spacing is exaggerated in FIG. 2. A ramp 72 provides an access way for a tire to be rolled onto the rollers 68. An operator's control cabinet is provided upon which is a control panel 78 on which are the various controls for the demounter. A lever 80 controls the pneumatic piston, compressed air being carried thereto by a flexible tubing 90. A first switch 82 controls application of power through a suitable cable 124 to the reversible motor 34 hung from its platform 30. A second switch 84 controls application of power to a motor concealed in the cabinet 76 for operation of the chain drive 70 and control of the rollers.

In operation, a tire 86 mounted on its rim 88 is rolled up the ramp 72 and allowed to rest upon the rollers 68. If the tire has a lock ring on its rim, as is often the case with truck tires, that ring is faced toward the rear of the machine, that is, toward shoe 62, the other side of the tire facing the first, backing uprights 12. Meanwhile, power may be applied to the roller chain drive by closing the second switch 84. Because of the taper of the rollers, as the chain drive 70 drives the one roller (and through the resultant rotation of the tire rotates the other roller), the tire will "drift" or travel toward the first uprights 12. The second switch 84 is now opened. The switch 82 which controls the raising and lowering of the ram, is turned one way or the other, causing the reversible motor 34 to drive in one direction or the other. In one direction, the motor drives the gearing coupled to the vertical hanger rod to advance the rod upwards, and in the other direction to advance the rod downwards, thereby moving the frame 38 and the piston chamber 58 contained therein, up or down as desired. The operator adjusts the height of the frame 38 so that the shoe 62, when advanced, will press against the side wall of the tire just below the rim 88, or on the lock ring, depending on the rim construction. In this position, the arcuate shape of the shoe 62 conforms closely to that of the tire 86 in its circumferential direction. The shoe extends for about one-sixth of the tire circumference measured along the tire side wall. Radially, the shoe 62 is about one-half to one-third the radial dimension of bead to tread, or just comfortably covers the tire wall. The shoe I have used successfully may be described as somewhat kidney-shaped and about 22 inches from tip to tip, and about 8 inches in the radial dimension at its broadest part, although the dimensions are by no means critical.

The operator now applies compressed air to the piston chamber 58 by opening a valve with the control lever 80. The piston rod 60 is driven forward to advance the shoe 62 toward and against the tire. However, if the operator observes that the adjustment of the height of the shoe 62 is not appropriate, he immediately releases the air, and the springs 66 retract the shoe 62 and piston rod 60. If, however, he finds the shoe and piston rod at the correct height, just outside the rim 88, the piston is urged forward and the shoe strikes the tire 86 just below the rim 88. These is, of course, a reaction against the piston chamber 58, tending to force the chamber backwards. This reaction force is transmitted against the back plate 40 and by tension on the tension rods 52, to the upper and lower angle bars 54 and 56, which are therefore urged against the channel uprights 16, which thus serve to receive the rearward force or reverse thrust of the piston chamber 58. The forward force of the piston is exerted through the shoe 62 against the tire and by the tire against the uprights 12, which serve as a backing for the mounted tire.

As a result of the pressure of the shoe 62, the area immediately adjacent the shoe breaks away from the rim 88. With tubeless tires, it will be found that, usually, the seal is released with the first blow of the shoe. If not, the shoe 62 may be released for retraction and then driven forward again to deliver another blow to the tire. The air control lever is then returned to its initial position to release the air from the chamber 58, and the shoe is retracted by the springs 66. Now the roller control switch 84 is closed to turn the rollers 68 and tire 86. After the tire has rotated an amount so that the shoe 62 can press the tire area next adjacent that just pressed, that is, after the tire has rotated about 60°, the roller control switch 84 is opened, and the air control lever 80 is again operated. This sequence of operations is now continued until the shoe 62 has acted against the entire circumference of the tire, which may be after five or six times. As pointed out above, with truck tires it is preferable first to face the lock-ring side of the tire and rim towards the shoe and piston. However, if the tire is not completely separated on this side on the first round, the action may be repeated, as required. In general, it will be found that a single revolution of the tire is sufficient. The rim and tire assembly is now removed, faced the other way, and the operation is repeated.

After the operation is completed on both sides, the rim and tire assembly is removed from the rollers, and it will be found that the lock ring is readily removed, and the rim readily slipped out of the tire, for example, with one or two easy blows of the foot, or of a rubber hammer.

Referring now to FIG. 3, there is shown partly in section, a tire demounting machine generally similar to that of FIGS. 1 and 2, just described, but modified with respect primarily to the roller drive. It will be apparent that the machine of my present invention will be most useful and be in greatest demand in those places where a large volume of tires are being demounted. One example of such a place is a tire retreading plant. Here it is to be expected that a large number of tires will be demounted in a short period of time, one after the other. In such case, the tire demounting operation can be facilitated by employing the modified tire demounting machine illustrated in FIG. 3.

In accordance with the modification of FIG. 3, means are provided for causing the tire to be continually rotating as it rests in the well of the machine awaiting actuation of the ram, and means are provided for stopping automatically the rotation of the tire in response to the thrust or forward movement of the ram toward the tire.

In the particular embodiment selected for illustration in FIG. 3, the drive motor 136 for the roller 168 is normally energized, since the power is normally "on." For example, the circuit from the power lines L–1, L–2 to the roller drive motor 136 may be through a normally-closed power "on" switch 189 and a normally-closed second switch 184 in series. Switch 184 may conveniently be a micro-switch. Only one of the two rollers 168, 169 need be driven by the motor; the other is driven by the rotating tire. In FIG. 3, roller 168 is shown to be driven by motor 136 through suitable reduction gearing 137.

Since driven roller 168 is normally rotating, as soon as the tire 86 is rolled up the ramp and on to the rollers, the tire begins to rotate.

In operation, the operator first adjusts (if adjustment be necessary) the height of the ram so that the shoe 162, when the ram is actuated, will contact the tire just below the rim. Such adjustment, when necessary in the machine shown in FIG. 3, is made manually by the manually operable wheel 190. The compressed air control lever 180 is then operated to open valve 191 to admit compressed air into the cylinder or piston chamber 158 to drive ram 160 and its arcuate shoe 162 toward the rotating tire 86.

The means selected for illustration in FIG. 3 for stopping the driven rotation of the tire in response to the forward movement of the ram comprises a trip bar 192 welded or otherwise secured to the ram, as to the shoe 162, and movable with the ram, being slidingly supported in guide channel 193. At the rearmost end of trip bar 192 is a depending finger 194 adapted to actuate the micro- or other spring-biased switch 184 as the finger 194 passes by, thereby to open the power circuit at the switch contacts. Preferably, switch 184 is actuated early in the movement of the ram 160 in order to facilitate location of the sector on the tire at which contact will be made by the shoe 162. As the ram 160 continues its forward movement, following initial opening of the switch 184, the switch is held open, as by the finger 194, and the switch 184 does not return to closed-contact position until after the ram shoe 162 has been withdrawn from the tire and the finger has returned almost to the rearmost extremity of its movement. This action is shown schematically in FIG. 3 wherein, as the finger 194 contacts the upstanding portion 195 of the spring-biased angle member 196, the angle member pivots about pivot point 197, thereby raising the switch arm from the contacts, thus opening the power circuit to the roller drive motor 136.

Return of the ram 160 to its retracted position is accomplished in the illustrated embodiment by means of springs 166, as has already been described in connection with FIGS. 1 and 2. To permit a rapid retraction of the ram 160, I provide an exhaust valve 198 having a relatively large orifice, for example, a ¾" valve as compared with the input valve 191 which may be a ⅜" valve.

With the arrangement according to the present invention, damage to the bead of the tire is avoided, yet without requiring complicated machinery and large or excessive forces. Furthermore, wheels, rims, and tires of different sizes are readily and easily handled in a demounter according to the present invention.

Having thus described my invention, I claim:

1. A tire demounting machine comprising; a generally upright main frame having a cross gap therethrough forming a well for receiving a rim-mounted tire; a pair of rollers horizontally disposed on the floor of said well; an electric circuit including a manual switch having On and Off positions; motor drive means controlled by said manual switch for driving one of said rollers rotationally continuously when said manual switch is in the On position and the circuit is unbroken thereby to rotate continuously a tire disposed in said well; an adjustably elevatable carriage mounted in said frame on one side only of said well; a single horizontally-disposed cylinder and piston mounted on said carriage, said piston having connected thereto a rod which protrudes from the end of said cylinder facing said well; a shoe secured to the protruding end of said rod and forming with said rod a ram; spring biasing means for holding said ram normally in a retracted position; controllable fluid means for driving said ram against the action of said spring biasing means toward and against the tire disposed in said well and against one side of said frame; trip means secured to said ram and movable therewith; and circuit breaking switch means actuable by said trip means for disconnecting said motor drive means and stopping the rotation of said tire when said ram is moved toward said tire, said trip and switch means being arranged for maintaining said motor means disconnected until said ram has been returned substantially toward its retracted position.

2. A tire demounting machine as claimed in claim 1, characterized in that said controllable fluid means comprises pneumatic means and further characterized in that said cylinder is equipped with an exhaust valve having a relatively large orifice for permitting rapid exhaust of the air in said cylinder during retraction of said ram.

3. A tire demounting machine comprising; a generally upright main frame having a cross gap therethrough forming a well for receiving a rim-mounted tire; a pair of rollers disposed on the floor of said well on generally horizontal axes, the two surfaces of said rollers being lower and wider spread at one end than at the other; an electric circuit including a manual switch having On and Off positions, motor drive means controlled by said manual switch for driving one of said rollers rotationally continuously when said manual switch is in the On position and the circuit is unbroken thereby to rotate a tire disposed in said well continuously and thereby to cause the roller-contacting portion of said tire to slide down said rollers toward said one end and against the frame on that side of said well; a single adjustably elevatable carriage mounted in said frame on the other side of said well; a single horizontally disposed cylinder and piston mounted in said carriage, said piston having a rod secured thereto which protrudes from that end of said cylinder facing said well; a shoe secured to the forward end of said rod, said rod and shoe forming a ram; spring tensioning means secured to the shoe end of said ram for holding said ram normally in retracted position; controllable fluid means for actuating said piston and driving said ram against the action of said tensioning spring, toward and against a tire disposed in said well; trip means secured to said ram and movable therewith; circuit breaking switch means actuable by said trip means for breaking the circuit and disconnecting said motor drive means and stopping the rotation of said tire when said ram is moved toward said tire, said trip and switch means being adapted to maintain said motor means disconnected until said ram has been returned by said spring tensioning means substantially toward its retracted position; and cross bar means mounted in said main frame on said other side of said well for engaging and receiving the thrust of the upper portion of the rim of said rim-mounted tire.

References Cited in the file of this patent

UNITED STATES PATENTS

| | | |
|---|---|---|
| 1,567,472 | Skiles | Dec. 29, 1925 |
| 1,916,258 | Errig et al. | July 4, 1933 |
| 2,473,571 | Cook | June 21, 1949 |
| 2,521,149 | Butler et al. | Sept. 5, 1950 |
| 2,753,924 | Pearne | July 10, 1956 |
| 2,832,400 | Laughlin | Apr. 29, 1958 |
| 2,840,143 | Skiles | June 24, 1958 |
| 2,936,828 | Richner | May 17, 1960 |